June 27, 1939.  G. A. LYON  2,163,608
VEHICLE ACCESSORY
Filed Jan. 21, 1937   2 Sheets-Sheet 1
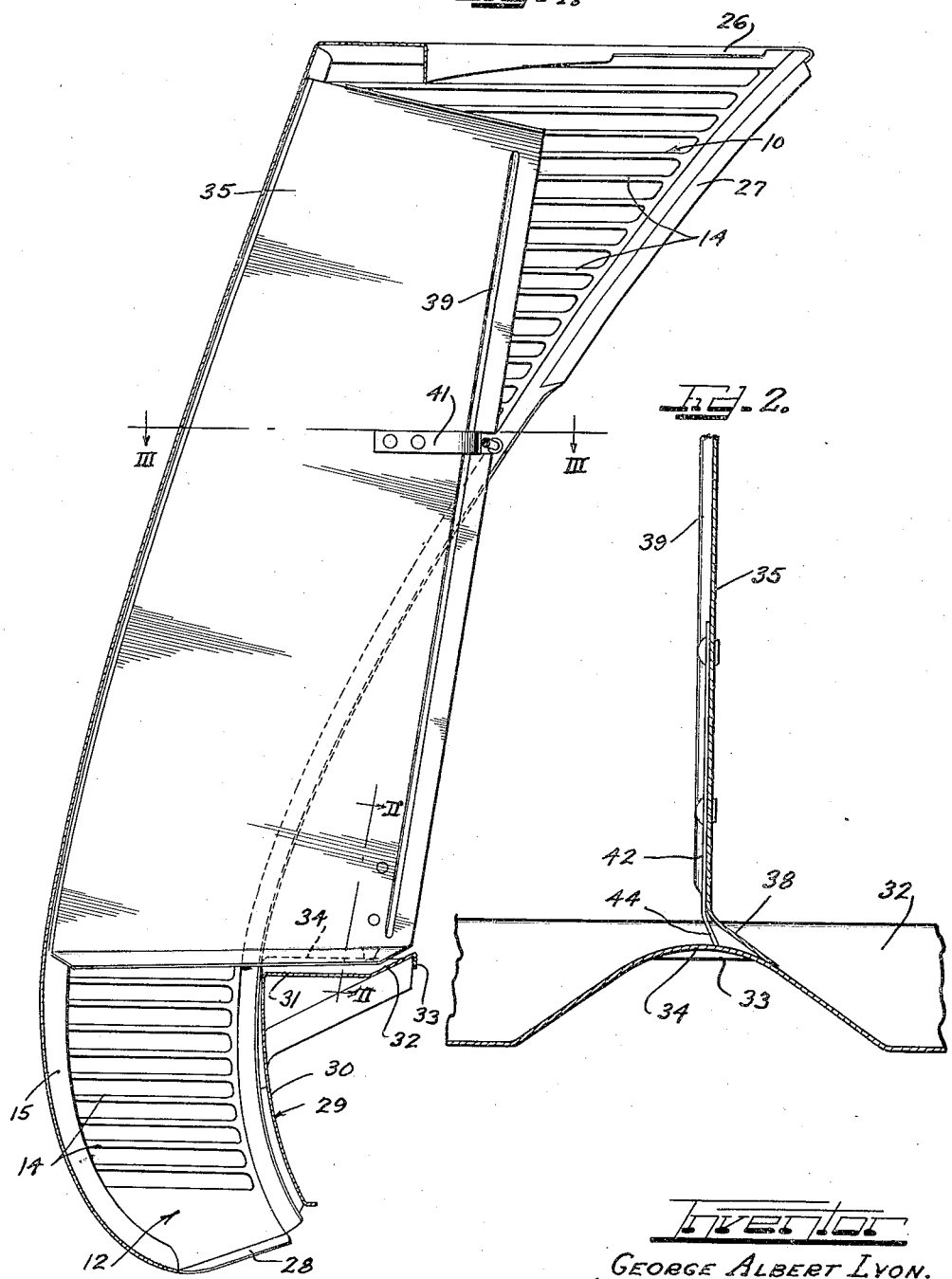
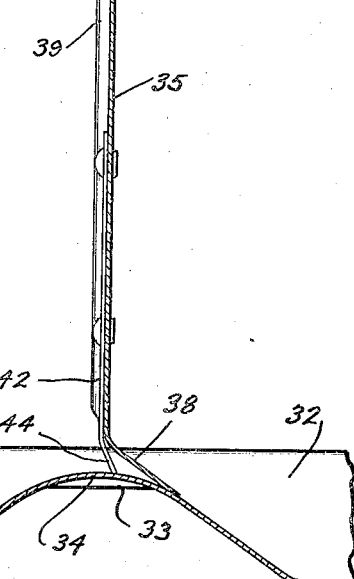
Inventor
GEORGE ALBERT LYON.

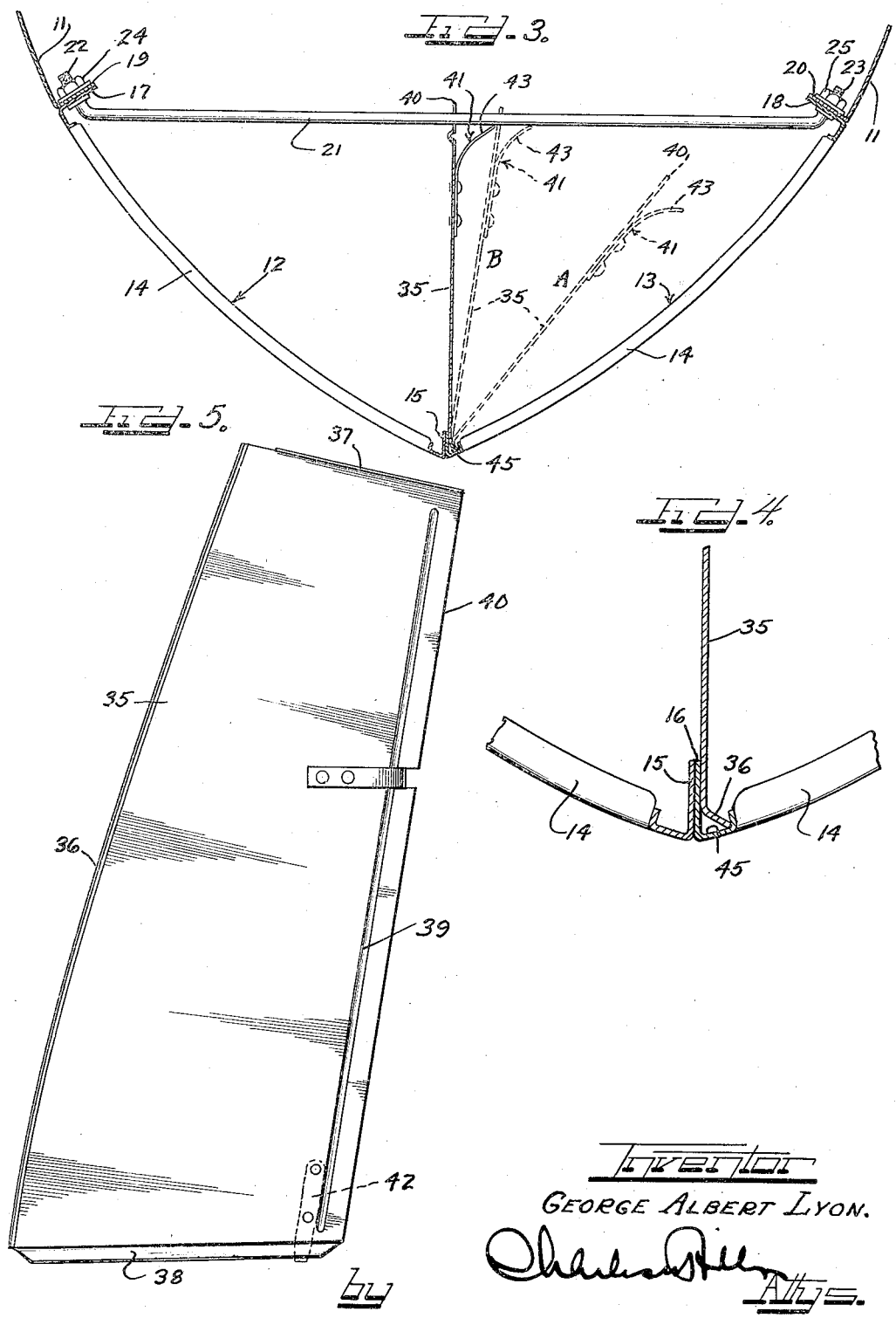

Patented June 27, 1939

2,163,608

UNITED STATES PATENT OFFICE 2,163,608

VEHICLE ACCESSORY

George Albert Lyon, Allenhurst, N. J.

Application January 21, 1937, Serial No. 121,412

16 Claims. (Cl. 293—54)

This invention relates to a vehicle accessory and more particularly to a baffle plate or partition for disposition between a vehicle radiator and a vehicle radiator grille.

The usual automotive vehicle of today is provided with an ornamental grille disposed in front of the cooling radiator. One type of ornamental radiator grille which has found great favor in the industry is a grille of the so-called "streamlined" type. That is to say, a grille which extends outwardly and rearwardly from a relatively sharp nose. With the advent of ornamental radiator grilles of this type and particularly where the grille is made up of a large number of horizontally disposed cross bars, it has become highly desirable to provide some arrangement to prevent cross-circulation of air through the radiator grille in order that the in-rushing air may be used with the utmost efficiency under the circumstances. It has also become highly desirable to provide some means which will prevent an unobstructed view through the radiator grille from one side to the other in order to enhance the general appearance of the automotive vehicle as a whole. The most desirable arrangement for accomplishing the purposes referred to above would be some equipment which is inexpensive to construct, which is sturdy and reliable in use, which is entirely free from vibration when applied to a vehicle which is in motion, and which efficiently brings about the desired results.

It is an object of this invention to provide a novel vehicle accessory possessing the above referred to highly desirable characteristics.

Another object of this invention is to provide a novel vehicle accessory for disposition between a vehicle radiator and a radiator grille which is economical to manufacture, which is rugged and reliabe in use, and which may readily and simply be mounted in desired position on the vehicle.

It is a further object of this invention to provide a novel radiator accessory including a baffle plate or partition for disposition in substantially a vertical longitudinal plane between the vehicle radiator and the raditor grille.

It is a still further object of this invention to provide a novel vehicle accessory including a baffle plate or partition which is adapted to be secured in desired position between a vehicle radiator and a vehicle radiator grille by means of a biting engagement.

Another and further object of this invention is to provide a novel means for securing the forward edge of a baffle plate or partition to an ornamental radiator grille.

Another and still further object of this invention is to provide a novel method of assembling and mounting a radiator baffle plate or partition between a vehicle radiator and a vehicle radiator grille.

A still further object of this invention is to provide a novel method and means for detachably securing a vehicle radiator baffle construction or ornamental partition in desired position on a vehicle.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 1 is a side elevational view partly in cross section of an ornamental radiator grille equipped with a baffle plate or partition;

Figure 2 is a cross-sectional elevational view taken along the line II—II of Figure 1 showing the lower mounting means of the baffle plate or partition;

Figure 3 is a cross-sectional plan view taken along the line III—III of Figure 1;

Figure 4 is an enlarged fragmentary view illustrating how the forward edge of the baffle plate or partition engages the radiator grille; and Figure 5 is a side elevational view of the baffle plate or partition.

In Figures 1 and 3 of the drawings there is shown an ornamental radiator grille 10 which is adapted to be secured to the main body 11 of an automotive vehicle (not shown). Ornamental radiator grille 10 comprises two complementary halves 12 and 13, each half including a large number of substantially equally spaced horizontal bars 14. Complementary halves 12 and 13 of radiator grille 10 are each provided with a rearwardly extending front flange 15 and 16 respectively which are adapted to be secured together in any suitable manner such as by bolting, riveting, or welding. The rear edges of complementary halves 12 and 13 are inturned as at 17 and 18, and are so formed as to lie in intimate contact with fastening flanges 19 and 20 respectively of vehicle body 11. A cross bar 21 extends between the rear edges 17 and 18 of complementary halves 12 and 13. The opposite ends 22 and 23 of cross bar 21 extends through suitable apertures in flanges 17 and 19 and 18 and 20 respectively and are secured thereto by cooperating nuts 24 and 25 which are arranged to be threaded on the threaded ends 22 and 23 of cross bar 21.

Ornamental radiator grille 10 is also provided with additional flanges 26, 27, and 28 which are adapted to be secured to suitable cooperating portions on the vehicle body (not shown). The particular design of ornamental radiator grille 10 may, of course, vary through wide ranges without departing from the spirit and scope of this invention, it being understood that this grille is merely for the purpose of ornamentation and is almost universally employed on automobiles today.

Secured to the lower rear edges of ornamental radiator grille 10 is a cross plate or bracket 29. As may be seen best in Figure 1, cross plate 29 extends upwardly as at 30 and then rearwardly as at 31. Rearwardly extending portion 31 of cross plate 29 is bent upwardly as at 32 near its rearward edge and then terminates in a downwardly extending lip 33. As may be seen best in Figure 2 of the drawings, rearwardly extending portion 31 is provided with a central longitudinally extending hill-like ridge portion 34.

Arranged for vertical longitudinal disposition within ornamental radiator grille 10 is a baffle plate or partition 35. As will hereinafter be used, the term "baffle" or "baffle plate" will be employed to specify any panel or partition mounted within the ornamental radiator grille whether it be for the purpose of confining or preventing undesired air circulation or for purposes purely ornamental in nature, such for example as preventing an unobstructed cross view through the cross bars of the ornamental radiator grille.

The particular configuration of baffle plate 35 may be understood best from an inspection of Figures 3 and 5 of the drawings. As will be observed, baffle plate 35 includes a bent forward edge 36, a bent top edge 37, and a bent lower edge 38. Bent top edge 37 is purely for the purpose of increasing the rigidity of the baffle plate 35, but bent edges 36 and 38 in addition to their function of increasing the general rigidity of the baffle plate are employed in securing and centering the baffle plate 35 as it is mounted in a radiator grille 10, as will presently be explained. To further increase the general rigidity of baffle plate 35, a longitudinal indent or groove 39 is formed therein in close proximity to the rear edge 40 thereof.

The method and means by which the baffle plate 35 is disposed in desired position within ornamental radiator grille 10 will now be described.

Two fingers 41 and 42 made from relatively stiff sheet material are riveted or otherwise suitably secured to baffle plate 35 in the manner illustrated in the drawings. The disposition of finger 41 may be seen best in Figures 1, 3, and 5 of the drawings. As will be observed from a careful inspection of Figure 3, the free end 43 of finger 41 curves gradually away from the plane of the baffle plate into biting engagement with cross bar 21. That is to say, any tendency of baffle plate 35 to rotate in a clockwise direction as viewed in Figure 3 would tend to cause the outer end of finger 41 to bite deeper into cross bar 21 thereby preventing such movement. Finger 42 is similarly arranged to make a biting engagement with hill-like ridge portion 34 of cross plate 29. As may be seen best in Figure 2, the downwardly extending free end portion 44 of finger 42 is bent at an angle with respect to the plane of baffle plate 35, thereby extending partially under underturned edge 38 of baffle plate 35, into biting engagement with hill-like ridge 34 of cross plate 29.

Inasmuch as underturned edge 38 of baffle plate 35 is arranged to bear against the side of hill-like ridge 34 as the baffle plate is swung into desired position, it will readily be understood that underturned edge 38 prevents movement of baffle plate 35 beyond its desired position. That is to say, as viewed in Figure 2 of the drawings, movement of baffle plate 35 to the left is prevented by reason of the fact that underturned edge 38 bears against the right side of hill-like ridge 34 while return movement to the right is prevented by reason of the fact that the downwarly extending free end 44 of finger 42 has made a biting engagement with hill-like ridge 34.

Upon careful inspection of Figures 3 and 4 of the drawings, it will be observed that cross bars 14 of complementary half 13 in cooperation with rearwardly extending front flange 16 forms a channel 45 into which the forward bent edge 36 of baffle plate 35 extends. Because of the angle which forward edge 36 is at with respect to the main body of baffle plate 35 the front edge 36 may be disposed in channel 45 and then the baffle plate is rotated in a counter-clockwise direction as viewed in Figure 3 of the drawings until it has reached its desired position.

The manner in which the baffle plate 35 may be assembled within ornamental radiator grille 10 is illustrated in Figure 3. Baffle plate 35 is first held in the position illustrated by the dotted line position A, the forward edge 36 being hooked into channel 45 of grille 10. Baffle plate 35 is then rotated in a counter-clockwise direction and as the finger 41 engages cross bar 21 and is forced along the inner surface thereof the outer free end 43 of finger 41 yields a sufficient extent to permit rotational movement of baffle plate 35. As baffle plate 35 reaches its full line position, as illustrated in Figure 3, underturned edge 38 engages the hill-like ridge 34 (as illustrated in Figure 2) and thereby prevents further counterclockwise movement of the baffle plate. Any tendency of baffle plate 35 to move in a reverse direction will cause the outer end 43 of finger 41 to bite into cross bar 41 and the outer end 44 of finger 42 to bite into hill-like ridge 34 of cross plate 29. Inasmuch as the forward edge 36 of baffle plate 35 is also firmly anchored within channel 35 as is illustrated in Figure 4, it will readily be understood that baffle plate 35 has been very firmly and securely fastened in desired position.

Although the securing means by which the baffle plate 35 is held in position within ornamental radiator grille 10 is of such a nature that the baffle plate 35 may be permanently left in its desired position without fear that the effectiveness of the mounting means will decrease with continued use of the automotive vehicle, nevertheless if it is desired, baffle plate 35 may be readily and quickly removed from radiator grille 10. By inserting a screw driver or similar tool between the outer end 44 of finger 42 and the hill-like ridge 34 and prying up the finger and by performing a similar operation on finger 41 the baffle plate 35 may be readily swung out of its mounted position.

From the above description, it is apparent that I have provided an extraordinarily simple method and means of mounting a baffle plate or partition within an ornamental radiator grille. It will furthermore be observed that this vehicle accessory is economical to manufacture and rugged and reliable in use.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. As an article of manufacture, a snap-in central baffle plate for vertical longitudinal disposition within a vehicle radiator grille having a portion thereof shaped to make a biting engagement with said grille, thereby to secure said baffle plate in desired position.

2. As an article of manufacture, a snap-in central baffle plate for vertical longitudinal disposition within a vehicle radiator grille having a plurality of fingers thereon adapted to make a biting engagement with said grille.

3. As an article of manufacture, a snap-in central baffle plate for vertical longitudinal disposition within a vehicle radiator grille having means thereon adapted to make a biting engagement with said grille, and also having means adapted to confine said baffle plate to a predetermined position within said grille.

4. The combination with an ornamental radiator grille including two complementary rearwardly extending halves, each of said halves having an inturned co-engaging front flange and a horizontally disposed cross bar between said halves adjacent their rear edges, of a vertical baffle plate having a forward edge extending into engagement with one of said flanges, and having fastening means thereon adapted to extend into securing engagement with said cross bar.

5. The combination comprising an ornamental grille having a centrally disposed rearwardly facing channel portion, cross members extending between the rear edges of said grille, a baffle plate having an edge disposed in said channel portion and extending rearwardly therefrom, and means on said baffle plate for making a biting engagement with at least one of said cross members.

6. The combination comprising an ornamental radiator grille, a member secured to said grille having a longitudinal hill-like ridge thereon, a baffle plate for vertical longitudinal disposition within said grille having means for preventing lateral displacement of the forward edge of said plate, and means on said plate for making a biting engagement with said hill-like ridge.

7. The combination comprising an ornamental radiator grille, a member secured to said grille having a longitudinal hill-like ridge thereon, a baffle plate for vertical longitudinal disposition within said grille having means for preventing lateral displacement of the forward edge of said plate, and means on said plate for making a biting engagement with said hill-like ridge, the lower edge of said baffle plate being arranged to define the desired position thereof within said grille.

8. The combination comprising an ornamental radiator grille having a centrally disposed rearwardly facing channel portion, a member secured to said grille having a longitudinal hill-like ridge thereon, a baffle plate for vertical longitudinal disposition within said grille, the forward edge of said baffle plate being disposed within said channel portion, the lower edge of said baffle plate being bent to engage a side of said hill-like ridge, and means on said baffle plate extending down into biting engagement with said hill-like ridge, thereby to secure said baffle plate in desired position within said grille.

9. The combination comprising an ornamental radiator grille having a centrally disposed rearwardly facing channel portion, a member secured to said grille having a longitudinal hill-like ridge thereon, a baffle plate for vertical longitudinal disposition within said grille, the forward edge of said baffle plate being disposed within said channel portion, the lower edge of said baffle plate being bent to engage a side of said hill-like ridge, and a finger secured to said baffle plate extending downwardly and partially under the lower edge portion of said baffle plate into biting engagement with said hill-like ridge.

10. The combination comprising an ornamental radiator grille having a centrally disposed rearwardly facing channel portion, a baffle plate for vertical longitudinal disposition within said grille, said baffle plate having a forward edge disposed within said channel portion, said baffle plate being adapted to be pivoted about said forward edge into desired position, and means for preventing lateral displacement of the rear edge of said baffle plate.

11. The combination comprising an ornamental radiator grille having a centrally disposed rearwardly facing channel portion, a baffle plate for vertical longitudinal disposition within said grille, said baffle plate having a forward edge disposed within said channel portion, said baffle plate being adapted to be pivoted about said forward edge into desired position, and means on said baffle plate spaced from said forward edge adapted to extend into biting engagement with a portion of said grille, thereby to prevent a lateral displacement of the rear edge of said baffle plate.

12. The combination with a vehicle radiator and a grille therefor having a transverse member of a baffle disposed endwise between the radiator and the grille, and having an intermediate portion formed to fit and embrace the transverse member, said baffle being bodily insertable between said grille and radiator.

13. As an article of manufacture, a baffle insertable endwise between a radiator and a grille of an automobile, said grille having at least one reinforcing cross bar thereon, said baffle having an intermediate portion formed to fit around and embrace said reinforcing cross bar, and having spring supports at the bottom thereof.

14. The combination comprising an ornamental grille of angular cross section and having cross members extending between the rear edges thereof, and a baffle plate inserted bodily and endwise within said angular grille, said baffle plate having a portion thereof slotted to extend about at least one of said cross members.

15. The combination with a vehicle radiator and a substantially V-shaped grille of a baffle disposed in a space between the radiator and the grille and extending at right angles to the radiator and in a plane intersecting the vertex of the grille, said baffle being bodily insertable between said grille and radiator.

16. The combination with a vehicle radiator and a substantially V-shaped grille of a baffle disposed in a space between the radiator and the grille and extending at right angles to the radiator and in a plane intersecting the vertex of the grille, said baffle being bodily insertable between said grille and radiator and being detachably held in place by a snap-on connection.

GEORGE ALBERT LYON.